(12) United States Patent
Bennett et al.

(10) Patent No.: US 12,373,803 B2
(45) Date of Patent: Jul. 29, 2025

(54) DECENTRALIZED PEER-TO-PEER TRANSACTION SERVICE

(71) Applicant: NCR Atleos Corporation, Atlanta, GA (US)

(72) Inventors: Ian James Frederick Bennett, Stratford (CA); Kamran Khashayar Fekri, Guelph (CA); Robert Anders Loberg, London (CA); Jacob Rodrick Parr, Guelph (CA)

(73) Assignee: NCR Atleos Corporation, Atlanta, GA (US)

( * ) Notice: Subject to any disclaimer, the term of this patent is extended or adjusted under 35 U.S.C. 154(b) by 216 days.

(21) Appl. No.: 17/869,072

(22) Filed: Jul. 20, 2022

(65) Prior Publication Data
US 2024/0029036 A1    Jan. 25, 2024

(51) Int. Cl.
| | |
|---|---|
| *G06Q 30/00* | (2023.01) |
| *G06Q 20/06* | (2012.01) |
| *G06Q 20/18* | (2012.01) |
| *G06Q 20/22* | (2012.01) |
| *G06Q 20/36* | (2012.01) |

(52) U.S. Cl.
CPC .......... *G06Q 20/065* (2013.01); *G06Q 20/18* (2013.01); *G06Q 20/223* (2013.01); *G06Q 20/36* (2013.01)

(58) Field of Classification Search
CPC .................................................. G06Q 20/065

USPC .............. 705/39, 1.1, 37, 26.62, 50, 44, 42; 707/712, 803

See application file for complete search history.

(56) References Cited

U.S. PATENT DOCUMENTS

| | | | |
|---|---|---|---|
| 11,423,398 B1 * | 8/2022 | Mullins .................. | G06Q 20/02 |
| 2019/0354945 A1 * | 11/2019 | Mahajan .............. | G06Q 20/065 |
| 2020/0151682 A1 * | 5/2020 | Hurry ................... | H04L 9/0637 |

OTHER PUBLICATIONS

ProQuestDialogNPL Search History.*

* cited by examiner

*Primary Examiner* — John H. Holly
(74) *Attorney, Agent, or Firm* — Schwegman Lundberg & Woessner, P.A.

(57) ABSTRACT

A seller of blockchain-based media of value for fiat currency is matched to a buyer of the blockchain-based media of value. Terms or conditions of a transaction are agreed to between the parties. A transaction identifier for the transaction is created and blockchain-based media of value of the seller is obtained from the seller's wallet. Instructions for a smart contract are created; the smart contract controls release of the blockchain-based media of value based on its terms. The buyer visits a Self-Service Terminal (SST) deposits fiat currency in an amount dictated by the terms and the SST verifies the deposit and notifies the smart contract. The instructions of the smart contract cause the crypto currency to be transferred to the seller's wallet. The deposited fiat currency can be withdrawn at an SST by the seller or credited automatically to a financial account associated with the seller.

10 Claims, 7 Drawing Sheets

DECENTRALIZED PEER-TO-PEER TRANSACTION SERVICE

BACKGROUND

On and off-chain cryptocurrency transactions have many bottlenecks that have been a problem for the cryptocurrency industry ever since it began to go mainstream. For example, a bitcoin transaction can take 10 minutes to an hour to complete depending upon the load on the blockchain. A seller who desires to sell cryptocurrency for a fiat currency, such as dollars, can experience substantial transaction fees for the conversion and can wait for an unreasonable amount of time, often days, before the seller has access to the fiat currency. Moreover, during the wait, the seller has no access to the sold cryptocurrency nor access to the expected fiat currency.

Further, the only existing secure and safe way to sell cryptocurrency for cash is through a large cryptocurrency exchange, such as Coinbase®. The other way cryptocurrency can be sold outside of the large exchanges is through peer-to-peer untrusted and insecure wallet-to-wallet transfers between a seller and a buyer. Typically, these wallet-to-wallet transactions are associated with fraud. Once a buyer pays the seller, the buyer has to rely on the honesty of the seller to transfer the cryptocurrency to the buyer's wallet. If the seller transfers the cryptocurrency to the buyer's wallet before receiving payment from the buyer, then the seller may never see the payment from the buyer. There is also a potential for theft and/or physical harm when a seller and a buyer agree to a sale and meet in person to consummate the deal. In these situations, it can be either the seller or buyer who is the protagonist.

In short, sellers and buyers of cryptocurrency have few viable options to transaction with each other. Selling through the exchange is the only smart option for the parties even if this entails excessive transaction fees and takes one or more days to successfully complete.

SUMMARY

In various embodiments, methods and a system for providing and operating a decentralized peer-to-peer transaction service are presented. A seller and a buyer of blockchain-based media of value reaches a peer-to-peer agreement to a peer-to-peer a sale of the blockchain-based media of value for a fiat currency. The agreement is implemented within a smart contract on the blockchain. The seller transfers the blockchain-based media of value in escrow to the smart contract. The buyer goes to a Self-Service Terminal (SST), such as an Automated Teller Machine (ATM), provides an identifier for the smart contract and deposits the fiat currency in accordance with the smart contract. The SST notifies the smart contract that the funds have been received. The smart contract transfers the blockchain-based media of value held in escrow to the wallet of the buyer and notifies the seller that the funds were received. The seller may go to an SST and provide an identifier for the smart contract, the smart contract authorizes withdrawal of the fiat current, and the SST dispenses the fiat currency to the seller.

According to an aspect, a method of providing and operating a decentralized peer-to-peer transaction service is presented. A first user requesting to sell blockchain-based media of value for a fiat currency is identified. A second user requesting to buy the blockchain-based media of value with the fiat currency is identified. Conditions for a transaction between the first user and the second user are obtained. A smart contract with the conditions is created and the blockchain-based media of value is obtained from a first user's wallet. Control over the blockchain-based media of value is provided to the smart contract and instructions for the smart contract are initiated over a blockchain to manage the transaction.

DETAILED DESCRIPTION

Cryptocurrency and non-fungible tokens (NFTs) sellers and buyers have few options when selling or purchasing cryptocurrency/NFTs besides a large cryptocurrency exchange. Peer-to-Peer (P2P) transactions between a seller and a buyer is not secure and is not safe. Embodiments, presented herein and below, provides a service by which P2P transactions are decentralized, secure, and efficient. The parties to a transaction experience no risk of loss and do not have to wait for days once a payment obligation of the transaction is satisfied. The service itself does not experience any risk associated with cryptocurrency/NFTs transactions as it only holds assets associated with a transaction in escrow on behalf of the parties. Thus, the enterprise associated with the service does not maintain any volatile assets on its balance sheet and does not run afoul of any governmental regulations with respect to cryptocurrency/NFTs. The enterprise may charge a small fee for the service or may offer it for free to customers as a value-added service.

Figure 1A:
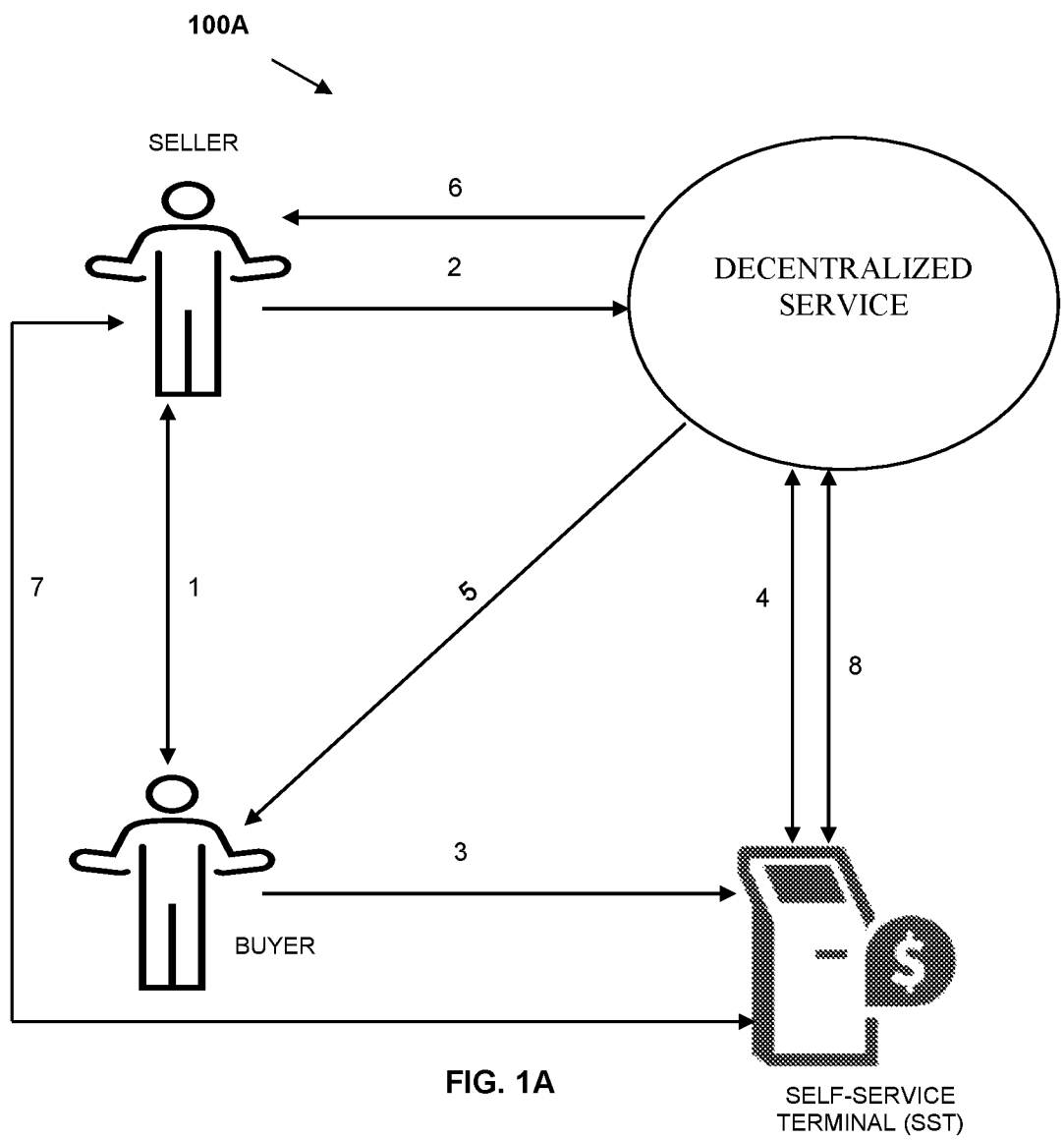
FIG. 1A is a diagram of workflows for providing and operating decentralized a peer-to-peer transaction service, according to an example embodiment.

FIG. 1A depicts workflows 100A for operating a decentralized a peer-to-peer transaction service, according to an example embodiment. In a first workflow, at 1, a seller and a buyer agree to terms for the buyer to sell a type and an amount of cryptocurrency/NFTs to the buyer. At 2, the terms are sent to decentralized service that creates a transaction identifier for the transaction and instantiates a smart contract on a decentralized blockchain with the conditions associated with the transaction and the transaction identifier. At 3, the buyer visits a Self-Service Terminal (SST) and provides the transaction identifier to a transaction interface of the SST. At 4, the SST identifies the transaction identifier as a transaction type associated with the blockchain and uses an Application Programming Interface (API) to interact with the corresponding smart contract over the blockchain by providing the transaction identifier. The smart contract provides the amount owed in the fiat currency back to the transaction interface of the SST. The SST displays the amount within an interface screen of the transaction interface. The buyer deposits the amount of fiat currency into a media depository of the SST. The SST confirms the amount matches the amount provided by the smart contract and credits an account with the deposited funds, where the account may be identified by the smart contract or may be preconfigured to be an existing account associated with the decentralized service. At 4 the SST uses the API to confirm the funds were received, this causes the smart contract to send the escrowed cryptocurrency/NFTs directly to a wallet associated with the buyer at 5.

In an alternative workflow to the first workflow, the buyer pays the fiat currency using a debit card or a credit card. Here, the blockchain-based workflow of the transaction interface interacts with a card reader to read a debit of credit card entered by the buyer and processes payment workflows to transfer the fiat currency from a financial account associated with the buyer to a financial account associated with the decentralized service.

A variety of additional workflows 100A from the first workflow are then available. In a first optional workflow the smart contract notifies the decentralized service that the fiat currency was received and that the buyer has the escrowed cryptocurrency/NFTs. This causes the service to transfer the fiat currency to a financial account of the seller. In a second optional workflow, the service uses the funds of the fiat currency to purchase a stable cryptocurrency, such as United States Dollar (USD) coin, and transfer to the stable coin to a wallet registered to the seller. In a third optional workflow, at 6, the smart contract notifies the seller that the seller can withdraw the fiat currency at an SST. At 7, the seller visits an SST and provides the transaction identifier for the smart contract to the smart contract. At 8, the SST utilizes the API to provide the transaction identifier and receives authorization back from the smart contract to dispense the fiat currency from the account of the service. It is noted that there may be a variety of other embodiments discussed herein and below with respect to FIG. 1B.

Figure 1B:
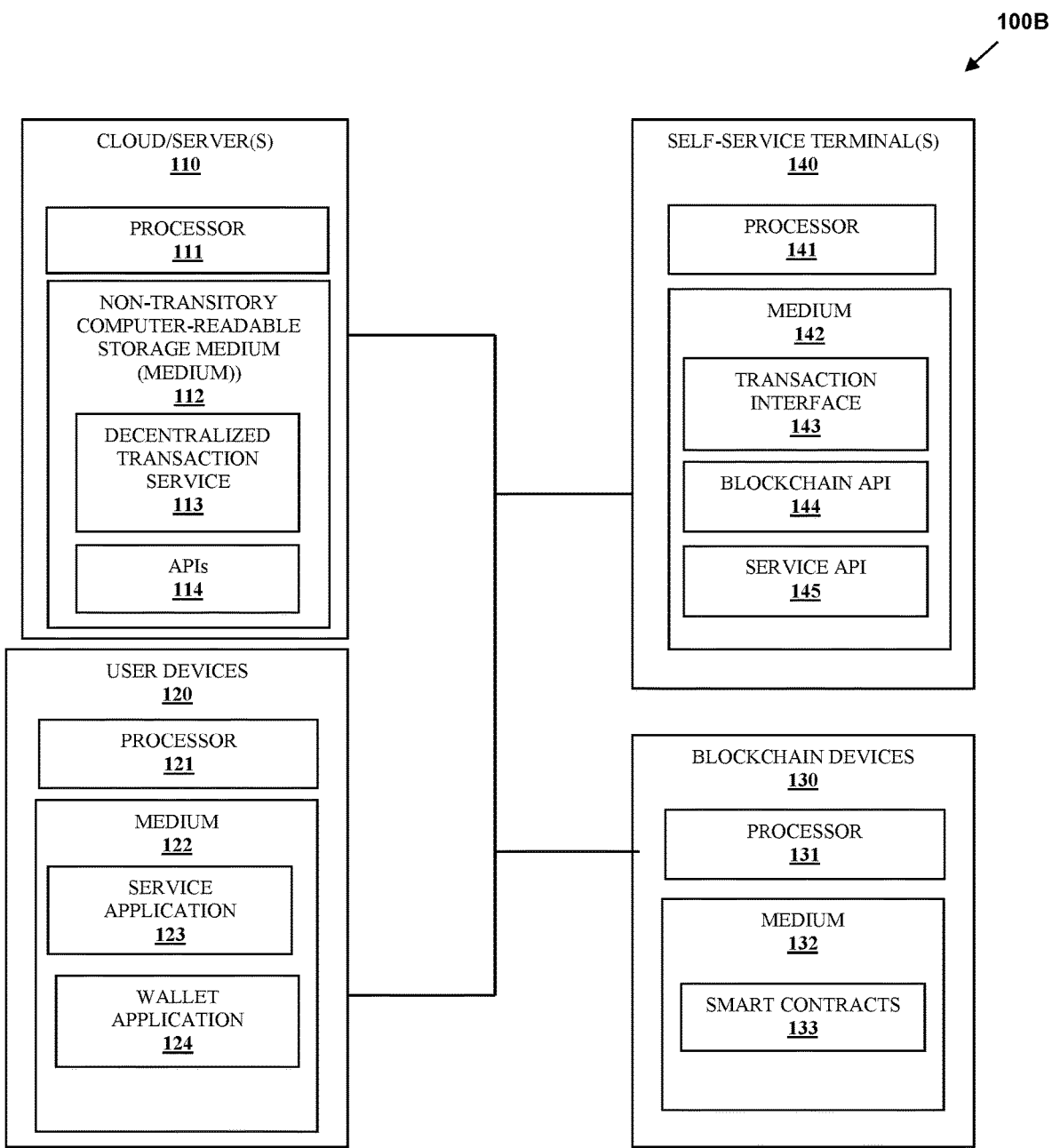
FIG. 1B is a diagram of a system for processing the workflows of FIG. 1A, according to an example embodiment.

FIG. 1B is a diagram of a system 100B for providing and operating a decentralized a peer-to-peer transaction service, according to an example embodiment. FIG. 1B also implements the workflows discussed in FIG. 1A and other workflows as discussed herein and below. It is to be noted that the components are shown schematically in greatly simplified form, with only those components relevant to understanding of the embodiments being illustrated.

Furthermore, the various components (that are identified in the FIG. 1B) are illustrated and the arrangement of the components is presented for purposes of illustration only. It is to be noted that other arrangements with more or fewer components are possible without departing from the teachings of providing and operating decentralized a peer-to-peer transaction service, presented herein and below.

A used herein, a "user" is intended to mean an individual or an entity (enterprise) that desires to purchase and/or sell in a transaction cryptocurrency and/or Non-Fungible Tokens (NFTs). At least two users engage in a P2P transaction with one another for a sale and/or purchase transaction. A user may be designated a "seller" or a "buyer" depending upon the context of a decentralized P2P transaction. According, the term "user" may be used interchangeably and synonymously with the terms "seller" and/or "buyer" herein and below.

As used herein, the phrase "blockchain-based media of value" is intended to mean cryptocurrency, NFTs, or any other blockchain address associated with something of value between parties to a transaction. Thus, terms "cryptocurrency" and "NFTs" may be used synonymously and interchangeable herein and below.

System 100B includes at least one cloud/server 110, user-operated devices 120, blockchain devices 130, and one or more SSTs 140. Cloud/server 110 includes a processor and a non-transitory computer-readable storage medium 112. Medium 112 includes executable instructions for a decentralized transaction service 113 and Application Programming Interfaces (APIs) 114, which when executed by processor 111 in turn causes processor 111 to perform operations discussed herein and below with respect to 113 and 114.

Each user-operated device 120 includes a processor 121, a non-transitory computer-readable storage medium 122. Medium 122 includes executable instructions for a service application (app) and a wallet application (app) 124, which when executed by processor 121 causes processor 121 in turn to perform operations discussed herein and below for 123 and 124.

Blockchain devices include processors 131 and a non-transitory computer-readable storage mediums 132. Mediums 132 includes executable instructions for smart contracts 133, which when executed by the processors 131 cause processors 131 in turn to perform operations discussed herein and below for smart contracts 133.

Each SST 140 includes a processor 141 and a non-transitory computer-readable storage medium 142. Medium 142 includes executable instructions for a transaction interface 143, blockchain API 144, and, optionally, a service API 145, which when executed by processor 141 in turn causes processor 141 to perform operations discussed herein and below with respect to 143-145.

Initially, users download service app 123 to their devices 120. Alternatively, one or more users utilize a web browser of device 120 that provides service app 123 through web pages and plugins to the browser. The users register with decentralized transaction service 113. When service app 123 is initialized, each user is registered for decentralized transaction service 113. During registration, each user minimally provides a wallet identifier associated with their wallet managed by their wallet app 124; optionally a financial account associated with fiat currency of the corresponding user. It is noted that a variety of other information may be collected from the user during registration, such as name, address, contact identifiers, phone number, etc. In some cases registration may require confidential information such as a social security number for compliance with government regulations (for example, if a user sells blockchain-based media of value above a government set limit during a fiscal year, then compliance may dictate that the user be sent an income form at year end and may require that the enterprise associated with decentralized transaction service 113 report it separately to the corresponding taxing authority).

Once a user is registered and the registration information is collected, the user is equipped to perform decentralized P2P transaction with another user through service application 123 and decentralized transaction service 113. A seller and a buyer agree to terms of a sale of blockchain-based media of value, their wallet identifiers, optionally, financial account identifiers, and conditions for the sale are provided through apps 123. The seller through wallet app 124 of the decentralized transaction service 113 interacting with wallet app 124 transfers an amount of the blockchain-based media of value required for the transaction from seller's wallet to a wallet associated with decentralized transaction service 113. Decentralized transaction service 113 then generates an instance of a smart contract 133 that embeds the conditions and enforces the conditions of the transaction. Decentralized transaction service 113 also generates a transaction identifier for accessing the smart contract 133 over the blockchain. The transaction identifier is sent to the seller and buyer through their service apps 123. Next, decentralized transaction service 113 activates source code instructions for smart contract 133 on the blockchain via the blockchain devices 130 using a blockchain API associated with APIs 114. The smart contract may be provided the blockchain-based media of value within the source code of the smart contract or may be provided a wallet identifier for a wallet that is associated with the decentralized transaction service 113. The blockchain-based media of value is held in escrow for the seller and the buyer and controlled by the conditions of the contract, which are enforced through execution of the smart contract 133 on the blockchain. The contract conditions may include a time period during which the buyer needs to fulfill the condition or obligation to pay for the blockchain-based media of value of the transaction such that when the time period expires, the smart contract will process instructions that transfers the blockchain-based media of value to the seller's wallet. It is noted that a variety of other conditions may be established, each of which are enforced by the smart contract 133 during its execution on the blockchain.

Assuming that the buyer is going to fulfill the obligation to pay, the buyer goes to an SST 140 to fulfill that obligation. Transaction interface 143 presents a smart contract option on an interface screen of the SST 140. When this is selected by the buyer, a smart contract or blockchain-based workflow is executed on the SST 140. The buyer is asked to enter the transaction identifier provided by decentralized transaction service 113 when the smart contract 133 was created. The workflow then uses blockchain API 144 to interact with the smart contract 133 to obtain any conditions needed by the SST 140 to process this portion of the transaction on the SST 140, such as an amount due by the buyer in fiat currency, an amount of blockchain-based media of value that will be transferred to the buyer's wallet, type of blockchain-based media of value, etc. The conditions are displayed on a workflow interface screen to the buyer. The buyer is then asked to deposit the fiat currency in the amount in a media depository of the SST 140. The buyer deposits the fiat currency into the media depository and the workflow, utilizing existing peripherals and currency verification techniques, verifies that the fiat currency is legitimate or is not counterfeit and verifies that the amount deposited matches the amount expected by smart contract 133.

Assuming the buyer deposited the correct amount, the workflow of the SST 140 may cause a financial account associated with the decentralized transaction service 113 or the seller (see embodiment below) to be credited the amount of the deposit and utilizes blockchain API 144 to notify the smart contract 133 that the fiat currency was verified in the correct amount and transferred to the financial account. This causes the smart contract 133 to transfer the blockchain-based media of value to the wallet of the buyer over the blockchain using the wallet identifier registered by the buyer. The smart contract 133 may also send a notification of successful payment to the decentralized transaction service 113 and/or service application 123 of the seller.

In an embodiment, the financial account, receives the fiat currency deposited by the buyer at the SST 140, is the financial account registered to the seller. In this scenario, the workflow of the SST obtains the financial account of the seller from the smart contract 133 using API 144 and the decentralized transaction service 113 creates the smart contract 133 instructions and/or conditions to include the financial account identifier for the seller.

In an embodiment, decentralized transaction service 113 receives a notification from the SST 140 or the smart contract 133 that the fiat currency was verified, received, and the blockchain-based media of value was transferred to the buyer's wallet. Assuming the SST 140 transferred the fiat currency to an account associated with the decentralized transaction service 113, decentralized transaction service 113 may either transfer the fiat currency from its financial account to a financial account registered to the seller or may send a notification to the seller that the fiat currency is available for withdrawal at an SST 140 at the leisure of the seller. In an embodiment, decentralized transaction service 113 may maintain a ledger on behalf of the seller indicating a balance that is available to the seller from which the seller can either withdraw at an SST 140 or request be transferred to a financial account of the seller.

In an embodiment where the seller does not directly receive the fiat currency associated with the sale into the seller's financial account, the seller may visit an SST 140 and provide the transaction identifier for the smart contract 133 through transaction interface 143. SST 140 retrieves and processes the blockchain-based workflow associated with blockchain-based media of value transactions and identifies a request made through the transaction interface 143 as a fiat currency withdrawal requested by the seller. The financial account is associated with the decentralized transaction service 113 based on the transaction identifier and the workflow utilizes service API 145 to verify that the withdrawal is permissible and an amount that is authorized for withdrawal by the seller. Decentralized transaction service 113 provides verification and amount using an API 114 and the workflow permits dispensing of the fiat currency in the amount through the media depository of the SST 140. In an embodiment, the seller may not be required to withdraw the full amount of the fiat currency associated with the transaction, in such cases decentralized transaction service 113 maintains a ledger and debits the ledger associated with the seller when the withdrawn amount is less than the full amount associated with the fiat currency.

In an embodiment where the seller directly receives the fiat currency associated with the transaction into the seller's financial account, the seller may visit any SST 140 and withdraw the funds. In this case, no special processing is needed by the SST 140 since the SST 140 is already equipped to permit fiat currency withdrawals with its existing fiat currency workflows for financial transactions associated with the transaction interface 143.

In an embodiment, a profile registered to the seller or initial terms/conditions of the transaction may provide an indication that the seller desires to receive the fiat currency deposited by the buyer at an SST 140 in an equivalent amount of a stable cryptocurrency. This scenario can either be processed by the smart contract 133 or processed by decentralized transaction service 113 over the blockchain to purchase the stable coin amount and directly transfer to a wallet registered to the seller. In an embodiment, any blockchain-based media of value type desired by the seller can be purchased using the fiat currency and transferred to the seller's wallet on behalf of the seller (processed by either the smart contract 133 or the decentralized transaction service 113).

In an embodiment, decentralized transaction service 113 provides through an interface of the service applications 123 options for sellers to post their blockchain-based media of value for sale and for buyers to indicate their desire to purchase blockchain-based media of value with fiat currency. Buyers and sellers can be matched based on search criteria entered by the buyers and sellers into the interface of service applications 123. The search criteria entered by the parties can indicate their terms for the smart contract. For example, a seller's search criteria may state 1 Bitcoin® is offered for sale at $20,000 within 7 days after acceptance, and the buyer's search criteria may state $20,000 is offered for one Bitcoin® within 3 days. Notice the time frame between the seller and buyer does not match but since the buyer's time frame does not exceed the seller's time frame the decentralized transaction service 113 may identify this as a match. Location of both the seller and buyer may not be considered as a factor in matching a buyer and seller when the desired fiat currency of the seller matches the fiat currency being offered by the buyer.

In an embodiment, the terms and conditions of the smart contact may instruct the SSTs 140 to authenticated a given buyer or seller through credentials provided such as a user identifier for the buyer or seller and a passcode registered with the decentralized transaction service 113. Here, the transaction interface 143 requests the buyer or seller to enter a user identifier and the credential through an encrypted personal identification number (PIN) pad. The blockchain-based workflow of the transaction interface 143 provides the identifier and the encrypted PIN to the decentralized transaction service 113 using service API 145. Decentralized transaction service 113 authenticates the buyer or seller based on the user identifier and credential and returns an authorization flag or non-authorization flag back to the blockchain-based workflow. Assuming the user is authenticated by the decentralized transaction service 113, the workflow process its portion of the transaction between the buyer and seller as discussed herein. In an embodiment, an encrypted PIN pad is not required for receipt of the credential, in such a circumstance the unencrypted credential is provided over a secure encrypted network connection between cloud 110 and SST 140; the network protocol between cloud 110 and SST 140 is still encrypted even though the data for the credential within the encrypted protocol stream is not also encrypted.

The buyers and sellers do not have to meet face-to-face and do not have to electronically communicate directly with one another unless a term of the seller suggests the seller is open to negotiation on the term. In term negotiation cases, the seller and buyer may use their registered user identifiers associated with their registrations with decentralized transaction service 113 to communicate with one another to agree on the term condition. In this way, the entire transaction remains anonymous from the perspectives of the buyers and sellers engaged in a transaction. However for governmental compliance, the decentralized transaction service 113 may be required to maintain a ledger of transactions and the registered parties involved in each. So, the parties remain anonymous to one another but not anonymous to the decentralized transaction service 113.

In an embodiment, a seller and buyer may be familiar with one another and agree to the terms or conditions of the transaction outside of using the decentralized transaction service 113. In such cases, the parties may indicate through the interface of service application 123 that they wish to perform a transaction with a specific registered buyer and a specific registered seller. In this case, at least one of the parties provides the terms and the remaining party is requested to confirm or authorize the terms through the corresponding service applications 123.

System 100 provides an intermediary to P2P buyers of blockchain-based media of value and sellers of blockchain-based media of value for fiat currency. The fiat currency can be any government-backed currency note, such as dollars, euros, etc. The seller can receive the fiat currency through SST withdrawals or via automatic financial account transfer. Alternatively, the seller may request that the fiat currency be used to purchase stable cryptocurrency or a different type of cryptocurrency/NFTs from the sold blockchain-based media of value which is automatically transferred to the seller's wallet. The buyers may provide the fiat currency to the SSTs 140 through deposits of government-backed notes or cash at the SSTs 140, debit card transactions at the SSTs 140, and/or credit card transactions at the SSTs 140.

Furthermore, with system 100 sellers and buyers may be matched based on provided terms for the transactions. Once terms are agreed to system 100 obtains the blockchain-based media of value from the sellers' wallets, creates a transaction identifier for identifying the smart contracts 133 on the blockchain, identifies the terms or conditions agreed to, and creates instructions for the smart contacts to transfer the blockchain-based media of value to buyers' wallets once fiat currency deposits are verified by an SST 140. The smart contracts are then initiated over the blockchain and referenced by the corresponding transaction identifiers. The buyers can visit any SST 140 that supports a transaction interface workflow which interacts with the smart contracts 133 over the blockchain. Fiat currency in the amount agreed to is deposited by the buyers, verified by the workflow of the SST 140, and the workflow notifies the smart contracts 133 over the blockchain. The smart contracts process instructions that cause the sellers previously transferred blockchain-based media of value to be transferred directly to the buyers' wallets.

System 100 eliminates the risks associated with P2P blockchain-based media of value transactions and eliminates the fees and time delays associated with large cryptocurrency exchange-based transactions. The risk is eliminated by decentralizing the P2P transactions enforced with smart contracts 133 that hold the sellers' blockchain-based media of value in escrow for the sellers, when terms of the smart contracts 133 are met the blockchain-based media of value is automatically released and transferred between the parties, when the terms are not met, the blockchain-based media of value is automatically returned to the sellers' wallets. System 100 does not hold any volatile assets, such as cryptocurrency/NFTs, and as such the enterprise providing system 100 does not run afoul of any governmental regulations as the transactions remain P2P using an escrow agreed to by the parties and controlled by the smart contracts 133.

The SSTs 140 are transaction terminals that include a media depository and media dispenser. In an embodiment, the SSTs 140 may include an ATM, a point-of-sale (POS) terminal, or a kiosk.

Figure 2A:
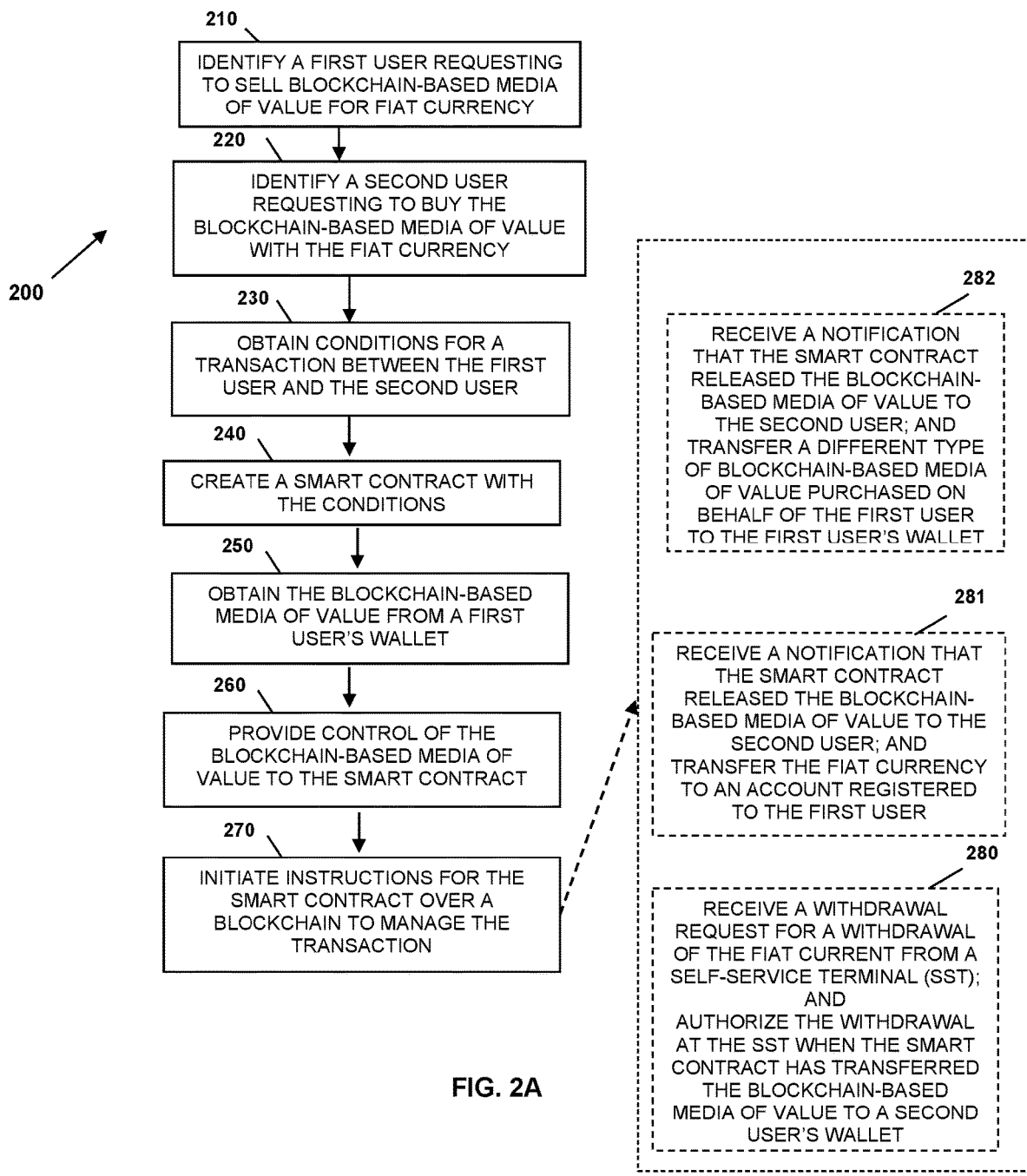
FIG. 2A is a diagram of a method of providing and operating a decentralized peer-to-peer transaction service, according to an example embodiment.
Figure 2B:
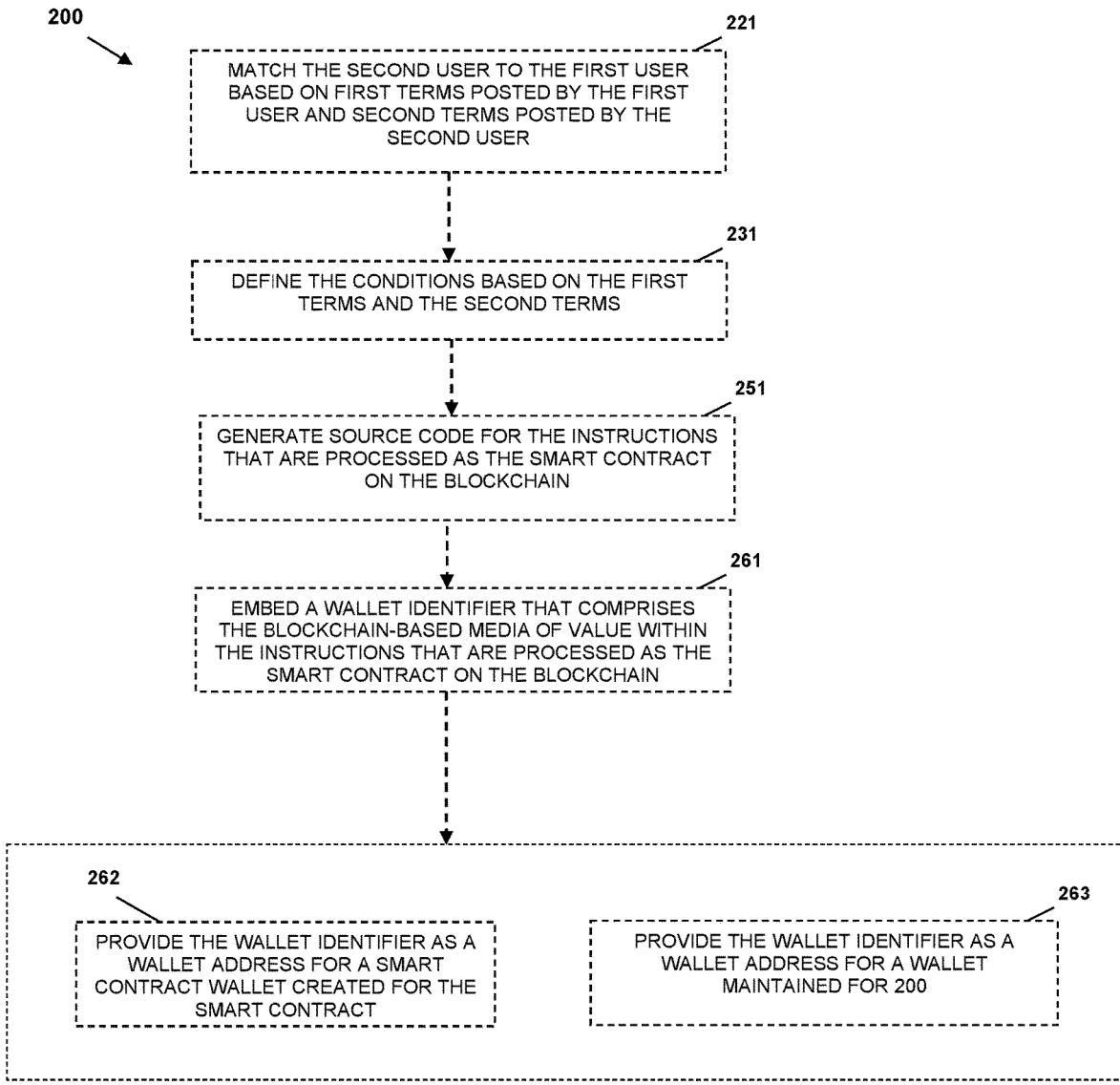
FIG. 2B is a diagram of embodiments of the method of FIG. 2A.
Figure 2C:
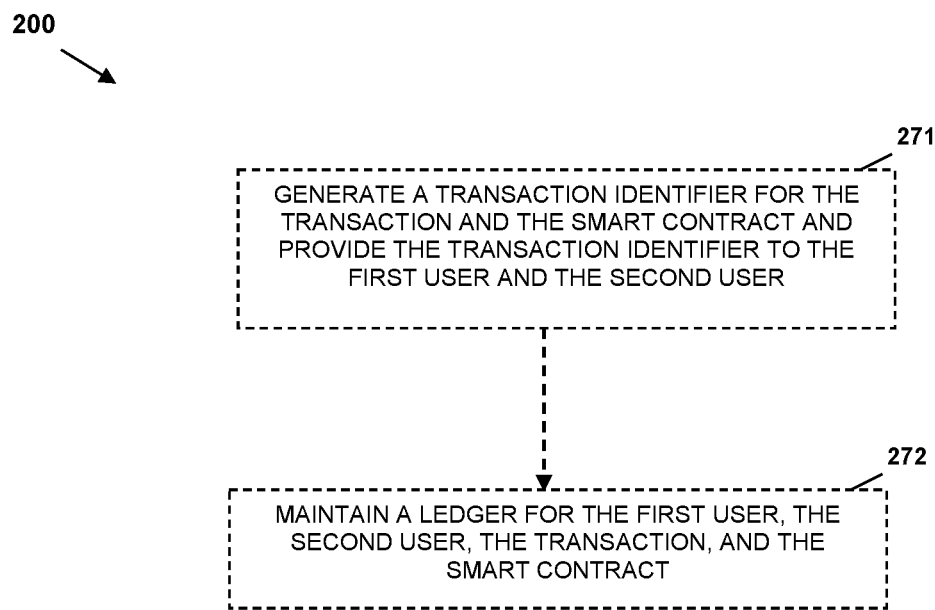
FIG. 2C is a diagram of additional embodiments of the method of FIG. 2A.

The above-referenced embodiments and other embodiments are now discussed with reference to FIGS. 2A, 2B, 2C, 3A, and 3B. FIGS. 2A, 2B, and 2C are diagrams of a method 200 of providing and operating a decentralized transaction service, according to an example embodiment. The software module(s) that implements the method 200 is referred to as a "transaction service." The transaction service is implemented as executable instructions programmed and residing within memory and/or a non-transitory computer-readable (processor-readable) storage medium and executed by one or more processors of a device or set of devices. The processor(s) of the device(s) that executes the transaction service are specifically configured and programmed to process the transaction service. The transaction service may have access to one or more network connections during its processing. The network connections can be wired, wireless, or a combination of wired and wireless.

In an embodiment, the transaction service executes on server 110. In an embodiment, the server 110 is one of several servers logically presenting and cooperating as a single server representing a cloud 110 or a cloud processing environment 110.

In an embodiment, the transaction service is one, all, or some combination of 113 and/or 114. In an embodiment, transaction service presents another, and in some ways, an enhanced processing perspective from that which was discussed above with system 1006.

dd

At 210 (shown in FIG. 2A), the transaction service identifies a first user requesting to sell blockchain-based media of value for a fiat currency. For example, a first user operates an interface associated with service app 123 and posts a request to sell an NFT or a defined amount of of a type of cryptocurrency; the post is identified as a request from the first user that the transaction service identifies.

At 220 (shown in FIG. 2A), the transaction service identifies a second user requesting to buy the blockchain-based media of value with the fiat currency. Similar to the example presented with 210, and as further illustration, a second user operates an interface associated with service app 123 and posts a request to buy blockchain-based media of value using the same type of fiat currency posted with the seller's request.

In an embodiment, at 221 (shown in FIG. 2B), the transaction service matches the second suer to the first user based on first terms posted by the first user in the first user's request and second terms posted by the second user in the second user's request. The first and second terms are conditions under which the first user is willing to sell the blockchain-based media of value for the fiat currency and conditions under which the second user is will to by the blockchain-based media of value with the fiat currency.

At 230 (shown in FIG. 2A), the transaction service obtains the conditions for the transaction between the first user and the second user. For example, the conditions may identify a type of blockchain-based media of value, a type of fiat currency, an amount of the blockchain-based media of value being offered for sale, a period of time under which the first user is willing to sell, a period of time under which the second user is willing to buy, and, optionally, a jurisdiction or geographical region based on the type of fiat currency.

In an embodiment of 221 and 230, at 231 (shown in FIG. 2B), the transaction service defines the conditions based on the first terms and the second terms. That is, terms of the first user should be met or exceeded such that there does not have to be a one-to-one match in each of the terms provided by the first and second user. For example, the first user may provided that the transaction has to be consummated within 7 days whereas the second user requests 3 days. In such a situation, the first user's terms are met and exceeded. Other examples are foreseeable as well, such as the second user states either a first fiat currency type will be paid, or a second fiat currency type will be paid. The compatible terms are used as the conditions. Additionally, the transaction service may add terms as conditions, such as the registered wallet identifiers of the first user and the second user, a registered financial account of the first user, etc.

At 240 (shown in FIG. 2A), the transaction service creates a smart contract with the conditions. That is instructions capable of independently executing on the blockchain and manage the transaction are generated with the conditions.

At 250 (shown in FIG. 2A), the transaction service obtains the blockchain-based media of value from a first user's wallet. As part of registration, discussed above with FIG. 1B, the transaction service can either instruct the first user to initiate the blockchain-based media of value to be transferred from the first user's wallet to a wallet of the transaction service or a wallet created for the smart contract, or the transaction service can initiate the transfer. After this, the first user has placed the blockchain-based media of value in trust or escrow with the smart contract, should the conditions of the smart contract not be satisfied, the instructions of the smart contract will cause the blockchain-based media of value to be transferred back to the wallet of the transaction service or the first user's wallet. If transferred back the transaction service's wallet, the transaction service immediately transfers back to the first user's wallet. Control of the blockchain-based media of value is based on the conditions enforce by the smart contract.

In an embodiment of 231 and 250, at 251 (shown in FIG. 2B), the transaction service generates the source code for the instruction that are processed as the smart contract on the blockchain. In an embodiment, the source code is in an interpreted language such that the source code is the instructions. In an embodiment, the source code is complied and linked as needed to generate the instructions.

At 260 (shown in FIG. 2A), the transaction service provides control of the blockchain-based media of value to the smart contract. This can be by providing the registered second user's wallet identifier and either a wallet identifier for the transaction service or the first user's wallet identifier. Now the smart contract is equipped through the instructions to enforce the instructions and transfer the blockchain-based media of value to the second user's wallet when the conditions are satisfied or transfer the blockchain-based media of value back to the first user directly through the first user's wallet identifier or indirectly through the transaction service's wallet identifier.

In an embodiment, at 261 (shown in FIG. 2B), the transaction service embeds the wallet identifier that includes the blockchain-based media of value within the instructions that are processed as the smart contract on the blockchain. The wallet associated with the wallet identifier holds the blockchain-based media of value.

In an embodiment of 261 and at 262 (shown in FIG. 2B), the transaction service provides the wallet identifier as an address for a smart contract wallet. The transaction service creates the wallet on behalf of the smart contract before initiating the instructions as the smart contract on the blockchain.

In an embodiment of 261 and at 263 (shown in FIG. 2B), the transaction service provides the wallet identifier as an address for a wallet maintained for the transaction service. That is, the transaction service's wallet includes the blockchain-based media of value, which the smart contract has rights to access.

At 270 (shown in FIG. 2A), the transaction service initiates the instructions for the smart contract over the blockchain to manage the transaction. At this point if the second user satisfies the conditions associated with the second user's obligations, the blockchain-based media of value will automatically be transferred to a second user's wallet registered to the second user.

In an embodiment, at 271 (shown in FIG. 2C), the transaction service generates a transaction identifier for the transaction and the smart contract and provides the transaction identifier to the first and second users. The transaction identifier may be an address on the blockchain for interacting with the smart contract and its instructions being processed.

In an embodiment of 271 and at 272 (shown in FIG. 2C), the transaction service maintains a ledger for the first user, the second user, the transaction, and the smart contract. The ledger may include compliance information, history information, dates of creation, dates of execution, processed or not processed information and why for example the second user did not satisfy a condition, etc.

In an embodiment, at 280 (shown in FIG. 2A), the transaction service receives a withdrawal request for a withdrawal of the fiat currency from an SST 140. The transaction service authorizes the withdrawal request at the SST 140 when the smart contract has transferred the blockchain-based media of value to a second user's wallet. This is a situation where the transaction service is interacting with the SST 140 because the first user is attempting to withdraw the fiat currency initially deposited by the second user.

In an embodiment, at 281 (shown in FIG. 2A), the transaction service receives a notification that the smart contract released the blockchain-based media of value to the second user. The transaction service transfers the fiat currency from a financial account associated with the transaction service to a financial account registered to the first user. This is a situation where the first user wants the fiat currency directly deposited into a registered financial account of the first user and the registered financial account is not embedded in the conditions of the smart contract for the smart contract to initiate this transfer on behalf of the first user.

In an embodiment, at 282 (shown in FIG. 2A), the transaction service receives a notification that the smart contract released the blockchain-based media of value to the second user. The transaction service transfers a different type of blockchain-based media of value purchased on behalf of the first user to the first user's wallet. Here, a profile associated with the first user may instruct the transaction service to uses the fiat currency received from the second user and purchase a different type of blockchain-based media on behalf of the user and transfer the different type of blockchain-based media of value directed to the registered first user's wallet.

Figure 3A:
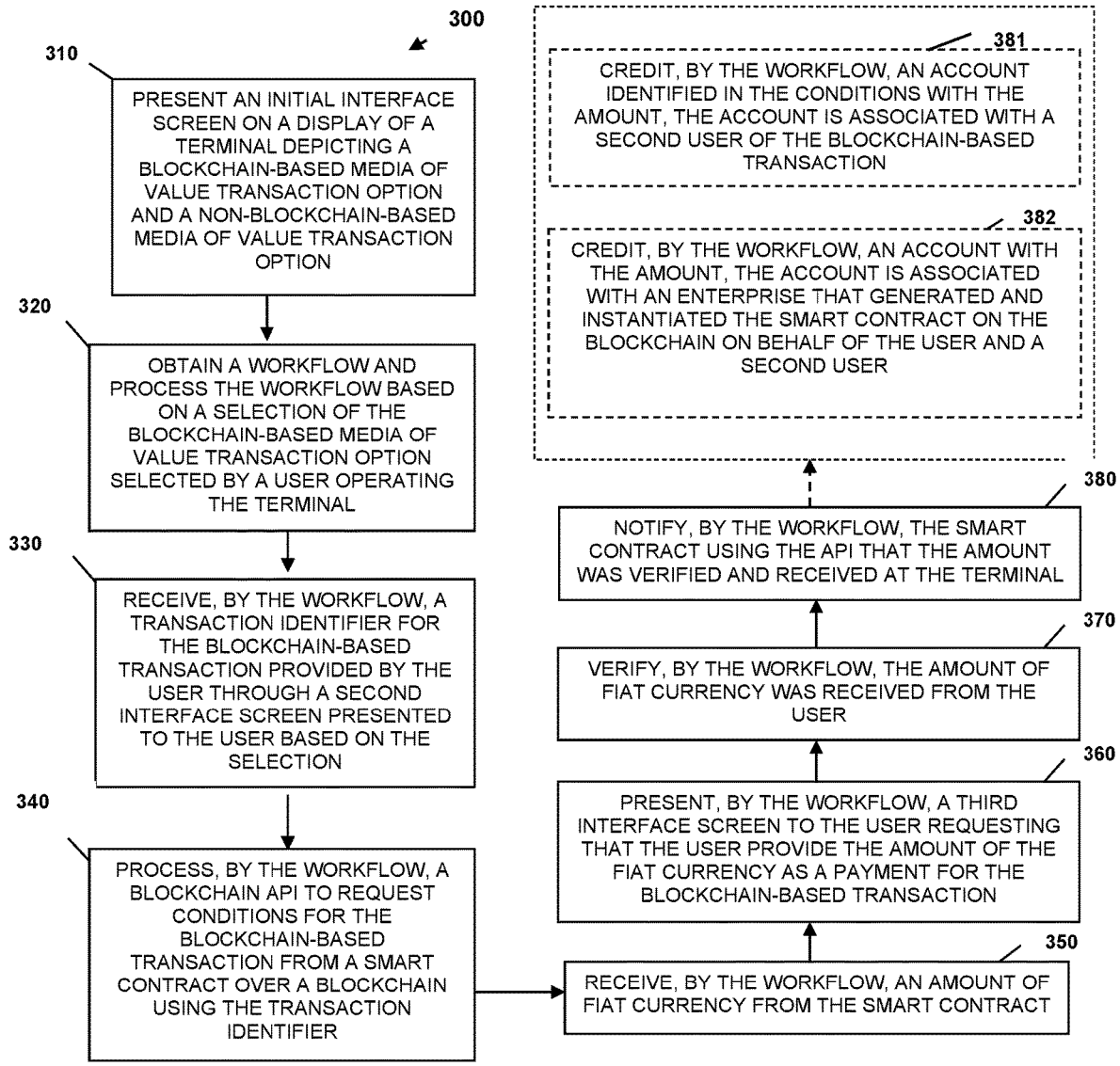
FIG. 3A is a diagram of another method of providing and operating a decentralized peer-to-peer transaction service, according to an example embodiment.
Figure 3B:
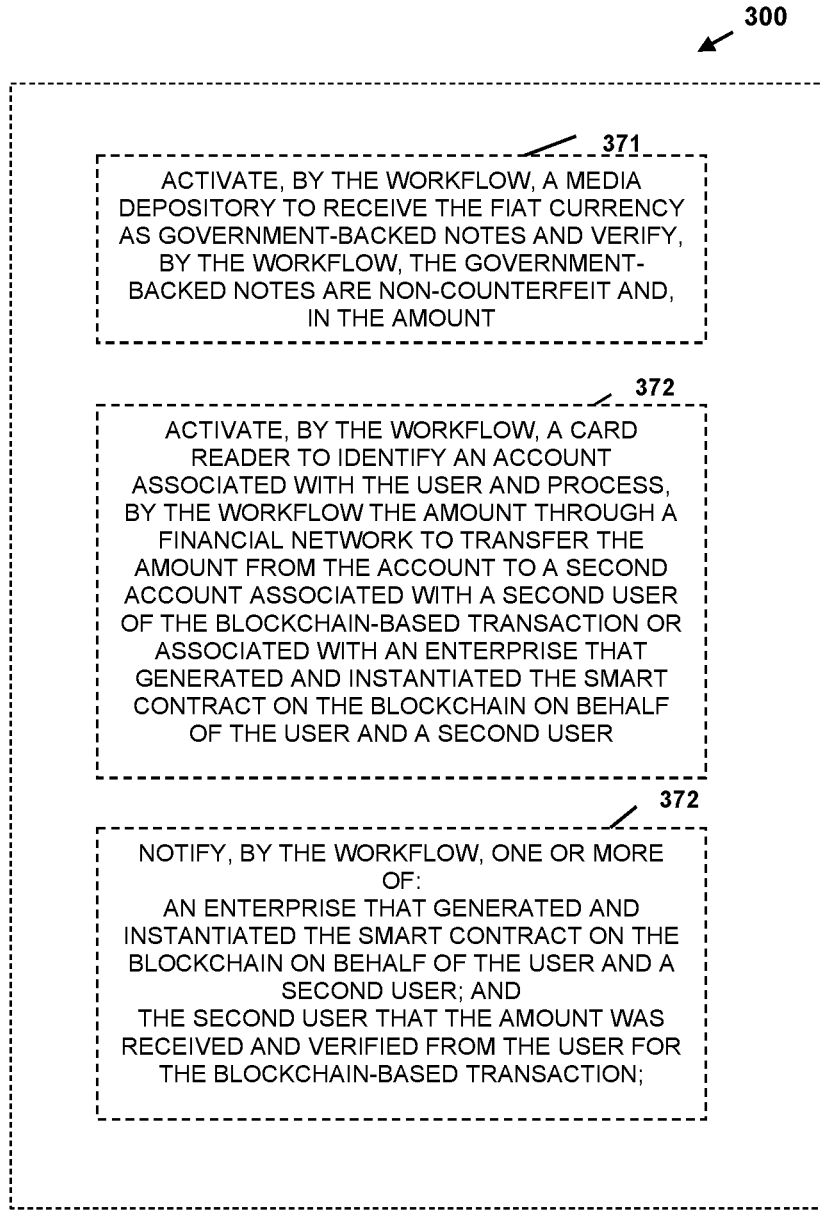
FIG. 3B is a diagram of embodiments of the method of FIG. 3A.

FIGS. 3A and 3B are diagrams of a method 300 of providing and operating a transaction processing service, according to an example embodiment. The software module(s) that implements the method 300 is referred to as a "transaction interface." The transaction transaction interface is implemented as executable instructions programmed and residing within memory and/or a non-transitory computer-readable (processor-readable) storage medium and executed by one or more processors of a device or set of devices. The processor(s) of the device that executes the transaction interface are specifically configured and programmed to process the transaction transaction interface. The transaction transaction interface may have access to one or more network connections during its processing. The network connections can be wired, wireless, or a combination of wired and wireless.

In an embodiment, the device that executes transaction interface is SST 140. In an embodiment, the SST 140 is an ATM, a POS terminal, or a kiosk.

In an embodiment, the transaction interface is all of, or some combination of, 143, 144, and/or 145. The transaction interface presents another and, in some ways, an enhanced processing perspective from that which was described above for 100B of FIG. 1B.

At 310 (shown in FIG. 3A), transaction interface presents an initial interface screen or splash screen on a display of a terminal 140. The splash screen depicts a blockchain-based media of value transaction option and a non-blockchain-based media of value transaction option. The non-blockchain-based media of value transaction option may include a fiat currency-related transaction, a reservation transaction, an information-related transaction, etc.

At 320 (shown in FIG. 3A), the transaction interface obtains a workflow and processes the workflow based on a selection of the blockchain-based media of value transaction option selected by a user who is operating the terminal 140. The terminal may also process different workflows associated with the non-blockchain-based media of value transaction option.

At 330 (shown in FIG. 3A), the workflow being processed receives a transaction identifier for a blockchain-based transaction provided by the the user through a second interface screen presented to the user based on the selection. The workflow generates the second interface screen when activated by the transaction interface at 320.

At 340 (shown in FIG. 3A), the workflow processes a blockchain API 144 to request conditions for the blockchain-based transaction from a smart contract over the blockchain using the transaction identifier. That is, the transaction identifier may be an address for the smart contract over the blockchain, which the workflow uses to interact with the smart contract for the blockchain-based transaction.

At 350 (shown in FIG. 3A), the workflow receives an amount of fiat currency from the smart contract. This is the amount required by the user for fulfilling conditions in the transaction which the user is responsible for.

At 360 (shown in FIG. 3A), the workflow presents a third interface screen to the user requesting that the user provide the amount of the fiat currency as payment for the blockchain-based transaction. The third interface screen may also allow the user to select the method that the user wants to use to provide the payment such as government-backed notes or cash, debit card, credit card, etc.

At 370 (shown in FIG. 3A), the workflow verifies the amount of the fiat currency was received from the user. This can be processed based on the method of payment selected by the user from the third interface screen at 360.

In an embodiment, at 371 (shown in FIG. 3B), the workflow activates a media depository to receive the fiat currency as government-backed notes. The workflow interacts with the media depository to verify that the government-backed notes are not counterfeit or are legitimate/authentic. The media depository is a peripheral device integrated into the terminal.

In an embodiment, at 371 (shown in FIG. 3B), the workflow activates a card reader of the terminal to identify card information associated with an account of the user. The card information is processed by the workflow through a financial network to transfer the amount of the fiat currency from the account to a second account. The second account is associated with a second user of the blockchain-based transaction or is associated with an enterprise that generated and instantiated the smart contract on the blockchain on behalf of the user and the second user. In an embodiment, the second account is an account associated with the method 200.

In an embodiment, at 372 (shown in FIG. 3B), the workflow notifies one or more of: 1) an enterprise that generated and instantiated the smart contract on the blockchain on behalf of the user and a second user; and 2) the second user that the amount was received and verified from the user for the blockchain-based transaction. In an embodiment, the workflow notifies the method 200 that payment from the transaction was received and verified from the user.

At 380 (shown in FIG. 3A), the workflow notifies the smart contract using the API 144 that the amount was verified and received at the terminal 140. This causes the smart contract to transfer the blockchain-based media of value from a wallet controlled by the smart contract to a wallet associated with the user and fulfills obligations associated with the user to a second user that was selling the blockchain-based media of value for the transaction.

In an embodiment, at 381 (shown in FIG. 3A), the workflow credits an account identified in the conditions obtained from the smart contract with the amount of the fiat currency. The account is associated with a second user of the blockchain-based transaction. This is a situation where the second user's account identifier was identified in the conditions processed by the smart contract, but the instructions of the smart contract did not initiate this transfer on its own for the first and second users.

In an embodiment, at 382 (shown in FIG. 3A), the workflow credits an account. Here, the workflow is configured with the account identifier, and it is associated with an enterprise that generated and instantiated the the smart contract on the blockchain on behalf of the first user and a second user. The account identifier may also be provided in the conditions received from the smart contract. In an embodiment, the account identifier is a financial account associated with the method 200.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
identifying a first user requesting to sell blockchain-based media of value for a fiat currency;
identifying a second user requesting to buy the blockchain-based media of value with the fiat currency;
obtaining conditions for a transaction between the first user and the second user;
creating a smart contract with the conditions;
obtaining the blockchain-based media of value from a first user's wallet;
providing control of the blockchain-based media of value to the smart contract;
initiating instructions for the smart contract over a blockchain to manage the transaction;
generating a transaction identifier that identifies the transaction and the smart contract on the blockchain;
providing the transaction identifier to the first user and the second user;
receiving a notification that the smart contract released the blockchain-based media of value to the second user;
transferring the fiat currency to an account registered to the first user;
receiving, by the smart contract, a confirmation that the fiat currency was verified in a correct amount and transferred to a financial account;
transferring, by the smart contract, the blockchain-based media of value to a second user's wallet using a second user's wallet identifier that was registered by the second user;
receiving the fiat currency at a self-service terminal (SST), wherein the SST identifies the transaction identifier as a transaction type associated with the blockchain and uses an application programming interface (API) to interact with a corresponding smart contract over the blockchain by providing the transaction identifier;
wherein the SST confirms the amount matches the amount provided by the smart contract and credits an account with deposited funds;
wherein the SST includes a media depository that receives and verifies the fiat currency as government-backed notes are non-counterfeit before crediting the account with the deposited funds.

2. The method of claim 1 further comprising:
receiving a withdrawal request for a withdrawal of the fiat currency from the SST being operated by the first user; and
authorizing the withdrawal at the SST when the smart contract has transferred the blockchain-based media of value to the second user's wallet.

3. The method of claim 1 further comprising:
receiving a notification that the smart contract released the blockchain-based media of value to the second user; and
transferring the fiat currency to an account registered to the first user.

4. The method of claim 1, wherein identifying the second user further includes matching the second user to the first user based on first terms posted by the first user and second terms posted by the second user.

5. The method of claim 4, wherein obtaining the conditions further includes defining the conditions based on the first terms and the second terms.

6. The method of claim 5, wherein creating further includes generating source code for the instructions that are processed as the smart contract on the blockchain.

7. The method of claim 6, wherein providing further encodes embedding a wallet identifier that comprises the blockchain-based media of value within the instructions that are processed as the smart contract on the blockchain.

8. The method of claim 7, wherein embedding further includes providing the wallet identifier as a smart contract wallet created for the smart contract.

9. The method of claim 7, wherein embedding further includes providing the wallet identifier as a wallet maintained for the method.

10. The method of claim 1, wherein processing generating further include maintaining a ledger for the first user, the second user, the transaction, and the smart contract.

* * * * *